No. 737,303. PATENTED AUG. 25, 1903.
T. W. VARLEY.
ELECTRICAL MEASURING INSTRUMENT.
APPLICATION FILED DEC. 26, 1902.
NO MODEL.
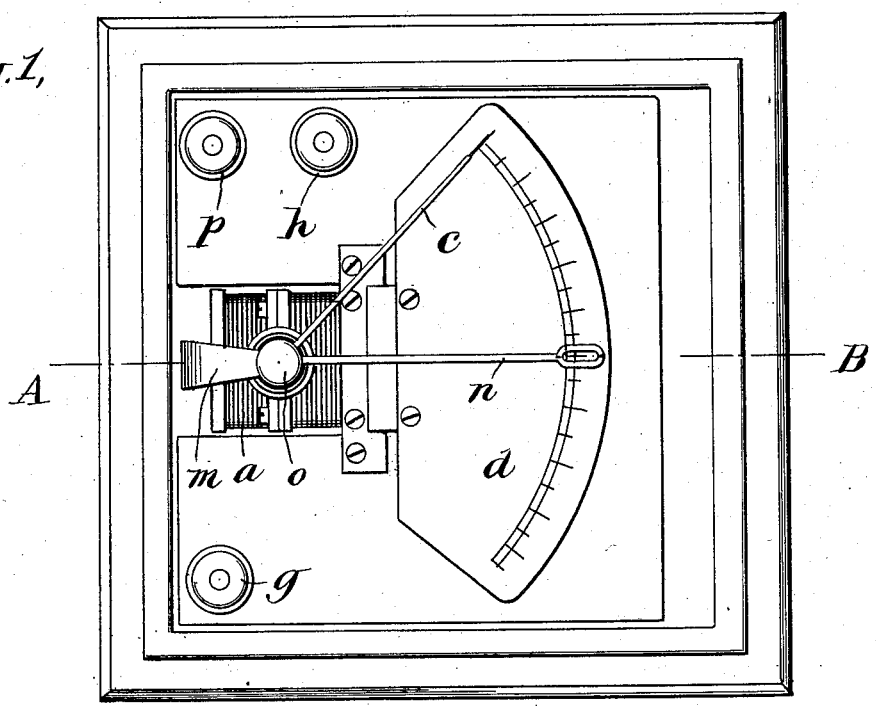
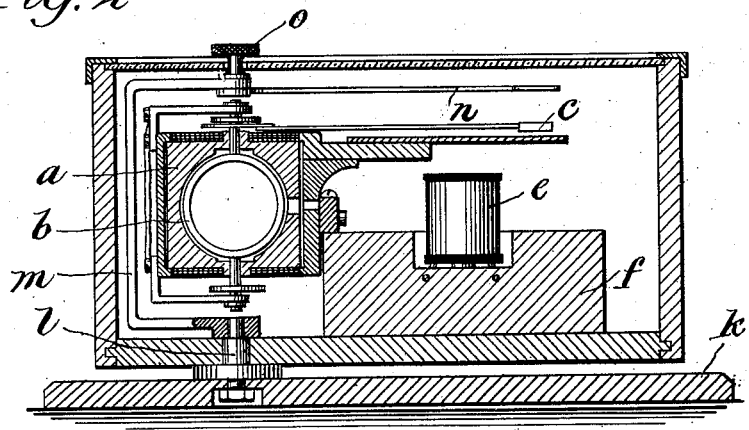
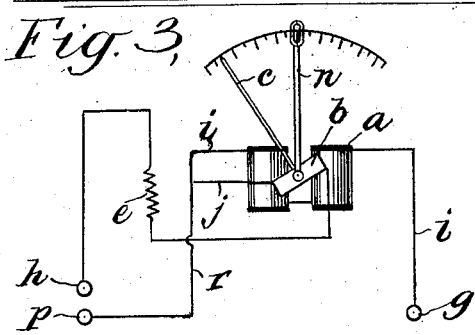
WITNESSES:
INVENTOR
Thomas W. Varley
BY
his ATTORNEY No. 737,303. Patented August 25, 1903.

UNITED STATES PATENT OFFICE.

THOMAS W. VARLEY, OF NEW YORK, N. Y.

ELECTRICAL MEASURING INSTRUMENT.

SPECIFICATION forming part of Letters Patent No. 737,303, dated August 25, 1903.

Application filed December 26, 1902. Serial No. 136,556. (No model.)

*To all whom it may concern:*

Be it known that I, THOMAS W. VARLEY, a citizen of the United States, and a resident of New York, in the county of New York and State of New York, have invented certain new and useful Improvements in Electrical Measuring Instruments, of which the following is a specification.

My invention relates to an improvement in electrical measuring instruments whereby a true reading of the same may be had unaffected by external magnetic influence.

The invention is applicable to electrical measuring instruments of various kinds; but for convenience of description and illustration I have shown the same in connection with an alternating-current voltmeter.

In the accompanying drawings, Figure 1 is a plan view of an alternating-current voltmeter. Fig. 2 is a central vertical sectional view on the line A B of Fig. 1, and Fig. 3 is a diagrammatic view of the electric circuits as used in my improvement.

Similar letters indicate similar parts throughout the several views.

The general construction and operation of the instrument illustrated being similar to that shown and described in United States Letters Patent to Weston, Reissued June 28, 1892, No. 11,250, and forming no part of my invention, I shall but tersely indicate its parts for the better understanding of my invention.

The instrument illustrated has a fixed or stationary coil $a$ and a coil $b$ oscillating or vibrating on inclosed pivots in the field of force of said stationary coil, said coils being electrically connected. The vibrating coil $b$, on the passage of the current through the circuit, including both coils, assumes an angular position, depending upon the difference of potential between the terminals of the circuit. The reversals of the current in both coils occur simultaneously, and hence an index or pointer $c$, connected to the movable coil $b$, is always deflected in the same direction, thus indicating the extent of said angular movement upon a suitable scale $d$. $e$ is an ordinary resistance-coil supported on the base $f$ in any suitable manner. The normal or zero position of the vibrating coil $b$ when no current is passing through the instrument is in a plane passing through the longitudinal axis of the fixed coil $a$, and the pointer $c$ is adjusted so as to mark "zero" on the scale $d$ when the vibrating coil $b$ is in this position.

The electrical connections of such an instrument as that illustrated are diagrammatically shown in Fig. 3 as follows: One terminal is connected to binding-post $g$ and the other to binding-post $h$, the current then flowing through fixed coil $a$ (here shown as consisting of two parts) by means of wire $i$, and through vibrating coil $b$ by means of wire $j$, and thence through resistance-coil $e$ to binding-post $h$. If the instrument is placed in operation where there are external magnetic influences acting upon the same, such external magnetic influence will cause the instrument to vary from the true reading. It is to overcome this defect that is the object of my invention.

In my improvement I have provided a false base $k$, to which the instrument proper is pivoted by means of pivot-pin $l$ in vertical alinement with the center of the vibrating coil $b$. Clamped to but rotatable on pivot-pin $l$ is an arm $m$, bent around the fixed coil $a$ and carrying at its upper end a normal index $n$. At the upper end of the arm $m$ is a thumb-screw $o$, projecting through the cover of the instrument, but free therefrom, by means of which the arm is adapted to be rotated on pivot-pin $l$. I provide an additional binding-post $p$ and connect the same by means of wire $r$ with wire $j$.

The operation of the apparatus is as follows: One terminal is connected with binding-post $p$ and the other with binding-post $h$. The current will then flow through vibrating coil $b$ only, and if external magnetic influence is present pointer $c$ will indicate the effect of the same on scale $d$. The instrument is then swung on pivot-pin $l$ until pointer $c$ indicates zero on scale $d$. Normal index $n$ is then turned by means of thumb-screw $o$ to register with pointer $c$. The terminal connected with binding-post $p$ is then disconnected and connected with binding-post $g$, the current then flowing along the circuit first hereinbefore described and deflecting pointer $c$ in the normal way. The instrument is then again swung on pivot-pin $l$ until normal index $n$ registers with pointer c on scale d, thus indicating the true reading unaffected by external magnetic influence.

It is obvious that the details of construction may be varied or that the improvement may be adapted to other forms of electrical measuring instruments than that illustrated without departing from the spirit of my invention, and I do not restrict myself either to such details or to the adaptation shown.

Having described my invention and in what manner the same may be performed, what I claim, and desire to secure by Letters Patent of the United States, is—

1. An electrical measuring instrument, a suitable support, a pivotal connection between said instrument and said support whereby the instrument may be swung laterally relative to such support and means for indicating the extent of lateral swing.

2. An electrical measuring instrument, a suitable support, a pivotal connection between said instrument and said support whereby the instrument may be swung laterally relative to such support and means mounted on said support for indicating the extent of lateral swing.

3. An electrical measuring instrument, a suitable support, a pivotal connection between said instrument and said support whereby the instrument may be swung laterally relative to such support, and means independent of the instrument mounted on said support for indicating the extent of lateral swing.

4. In an electrical measuring instrument having a fixed and a movable coil electrically connected, means for independently electrifying the movable coil whereby the latter is free to respond to exterior magnetic influence.

5. In an electrical measuring instrument having a fixed and a movable coil electrically connected, means for independently electrifying the movable coil whereby the latter is free to respond to exterior magnetic influence and means independent of the movable coil for marking its deflection.

6. In an electrical measuring instrument having a fixed and a movable coil electrically connected, means for independently electrifying the movable coil whereby the latter is free to respond to exterior magnetic influence, a suitable support, a pivotal connection between said instrument and said support and means mounted on said support to mark the position of the movable coil.

7. In an electrical measuring instrument having a fixed and a movable coil electrically connected, means for independently electrifying the movable coil whereby the latter is free to respond to exterior magnetic influence, means independent of the movable coil for marking the deflection thereof, and means adapted to permit the instrument to be swung laterally whereby the deflection of the movable coil may be caused to register with said independent means.

In witness whereof I have hereunto signed my name in the presence of two subscribing witnesses.

THOMAS W. VARLEY.

Witnesses:
GRACE L. HEASLEY,
SEABURY C. MASTICK.